June 30, 1970     D. E. BARBER     3,518,444
CONTROL SYSTEM FOR EXCAVATING MACHINERY
Filed Oct. 23, 1964     9 Sheets-Sheet 1
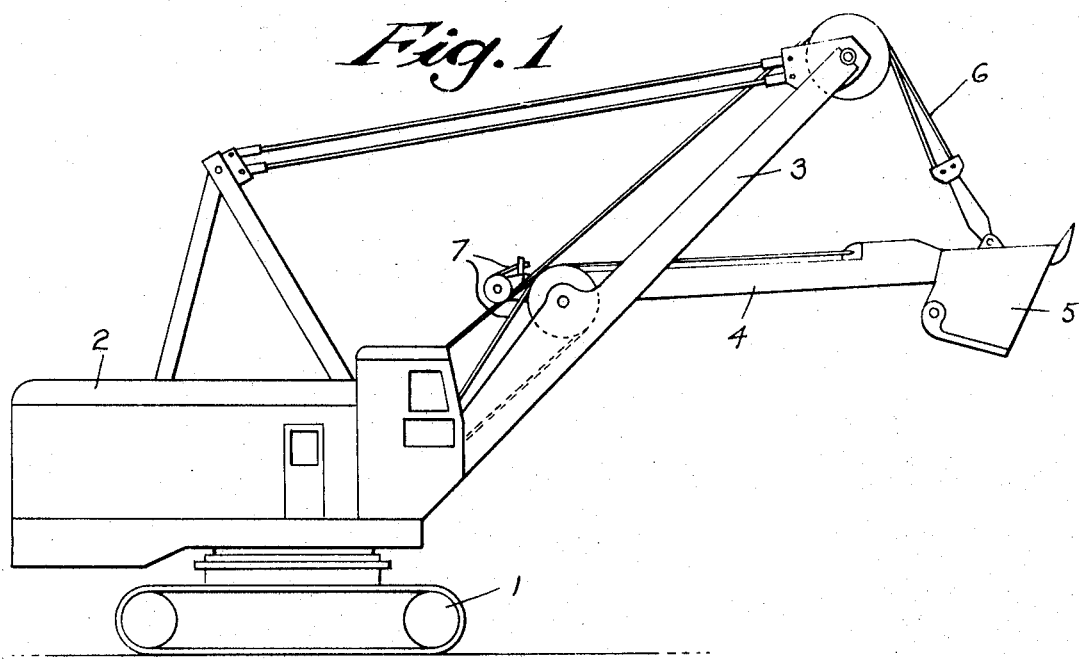
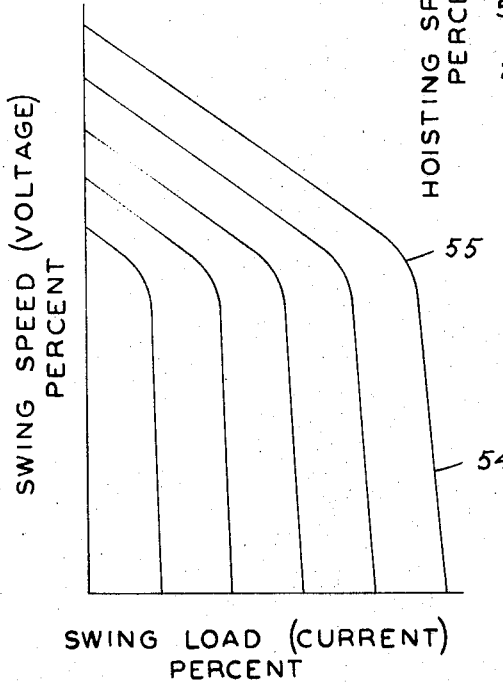
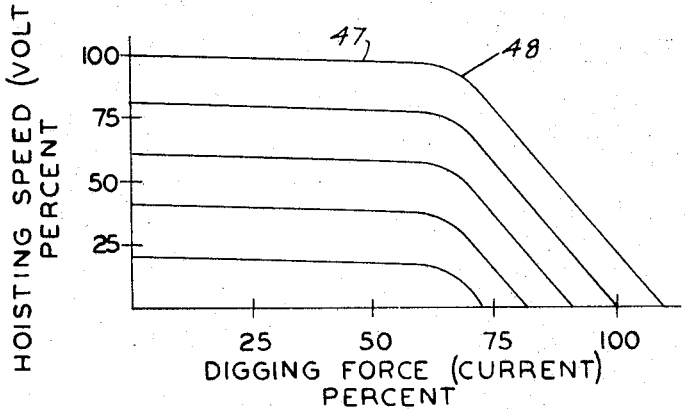
INVENTOR
DONALD E. BARBER
BY
Arthur H. Seidel
ATTORNEY June 30, 1970     D. E. BARBER     3,518,444
CONTROL SYSTEM FOR EXCAVATING MACHINERY
Filed Oct. 23, 1964     9 Sheets-Sheet 2

INVENTOR
DONALD E. BARBER

BY

ATTORNEY

June 30, 1970      D. E. BARBER      3,518,444

CONTROL SYSTEM FOR EXCAVATING MACHINERY

Filed Oct. 23, 1964

INVENTOR
DONALD E. BARBER

BY Arthur H. Seidel

ATTORNEY

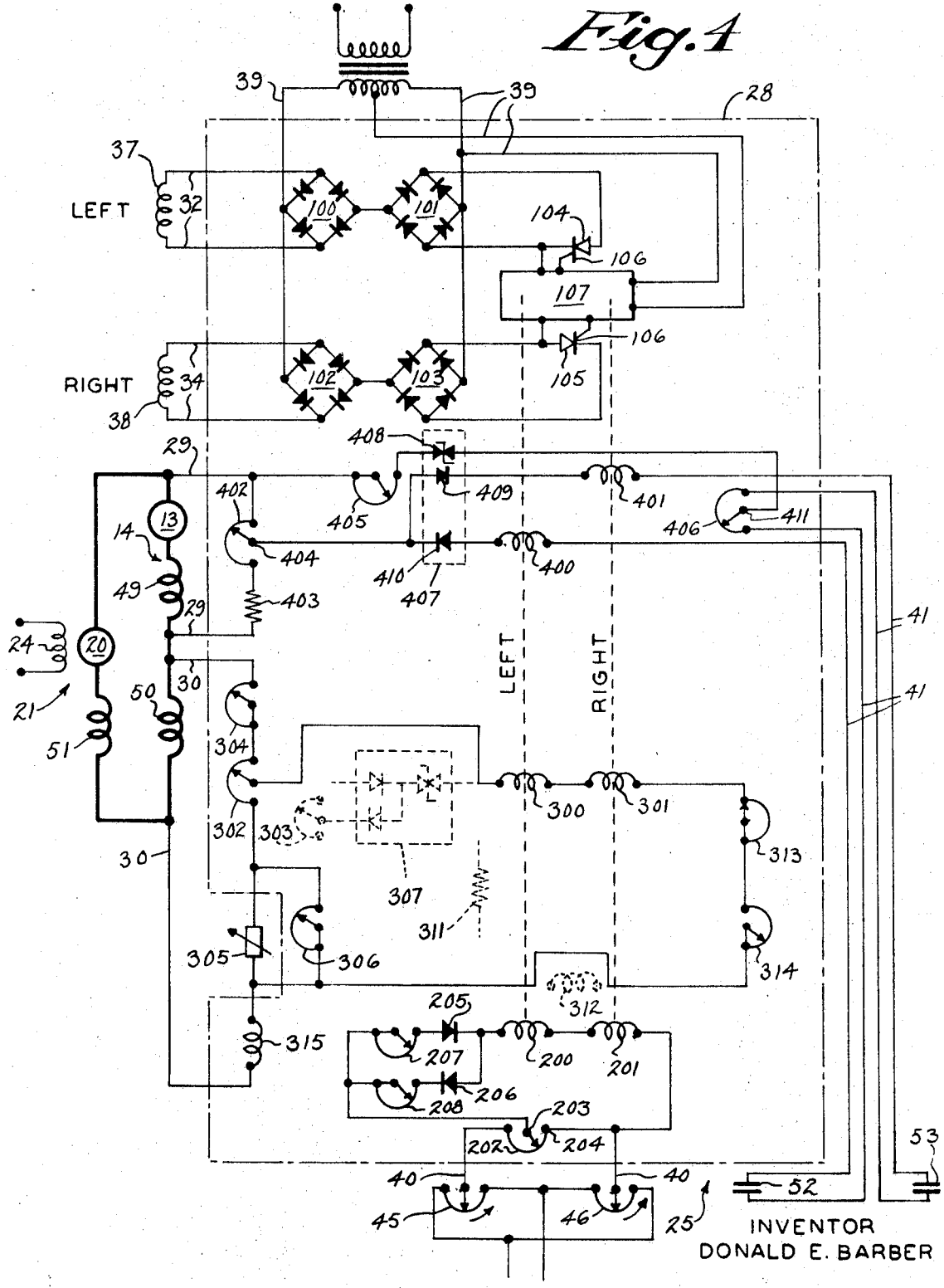

INVENTOR
DONALD E. BARBER

BY

ATTORNEY

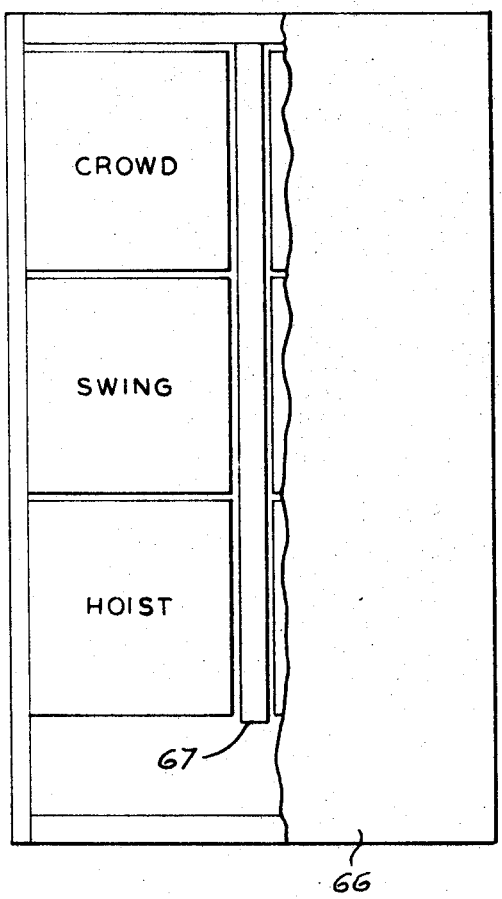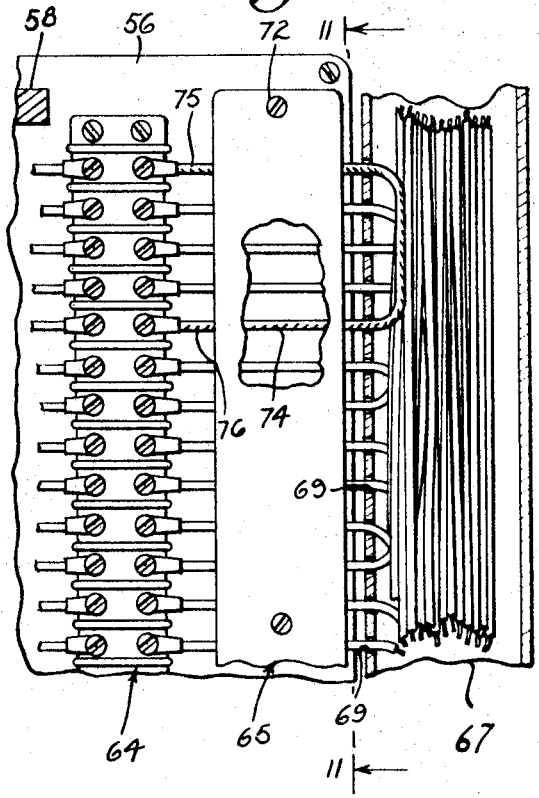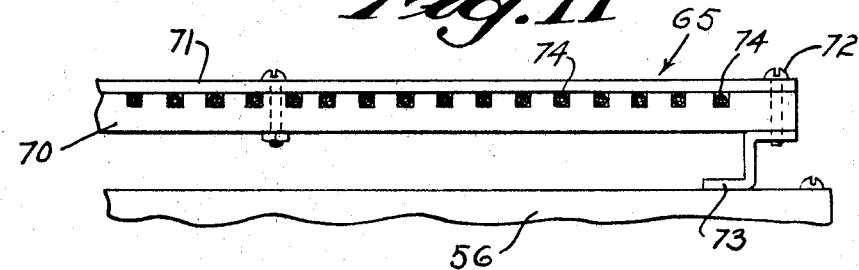

June 30, 1970  D. E. BARBER  3,518,444
CONTROL SYSTEM FOR EXCAVATING MACHINERY
Filed Oct. 23, 1964  9 Sheets-Sheet 7

INVENTOR
DONALD E. BARBER

BY *Arthur H. Seidel*

ATTORNEY

June 30, 1970   D. E. BARBER   3,518,444
CONTROL SYSTEM FOR EXCAVATING MACHINERY
Filed Oct. 23, 1964   9 Sheets-Sheet 9

INVENTOR
DONALD E. BARBER

BY

*Arthur H. Seidel*

ATTORNEY

United States Patent Office 3,518,444
Patented June 30, 1970

---

3,518,444
CONTROL SYSTEM FOR EXCAVATING MACHINERY
Donald E. Barber, South Milwaukee, Wis., assignor to Bucyrus-Erie Company, South Milwaukee, Wis., a corporation of Delaware
Filed Oct. 23, 1964, Ser. No. 405,930
Int. Cl. B60l 11/04; H02k 5/24
U.S. Cl. 290—14    28 Claims

ABSTRACT OF THE DISCLOSURE

A control for an excavating machine having a generator and a motor for each of the three machine movements has a set of three interchangeable control circuits. Load current and operating voltage indicating sub-circuits each contain a discontinuous current gate. Circuit connections are provided for removal of the discontinuous current gate from circuits which do not require this device.

---

Figure 2:
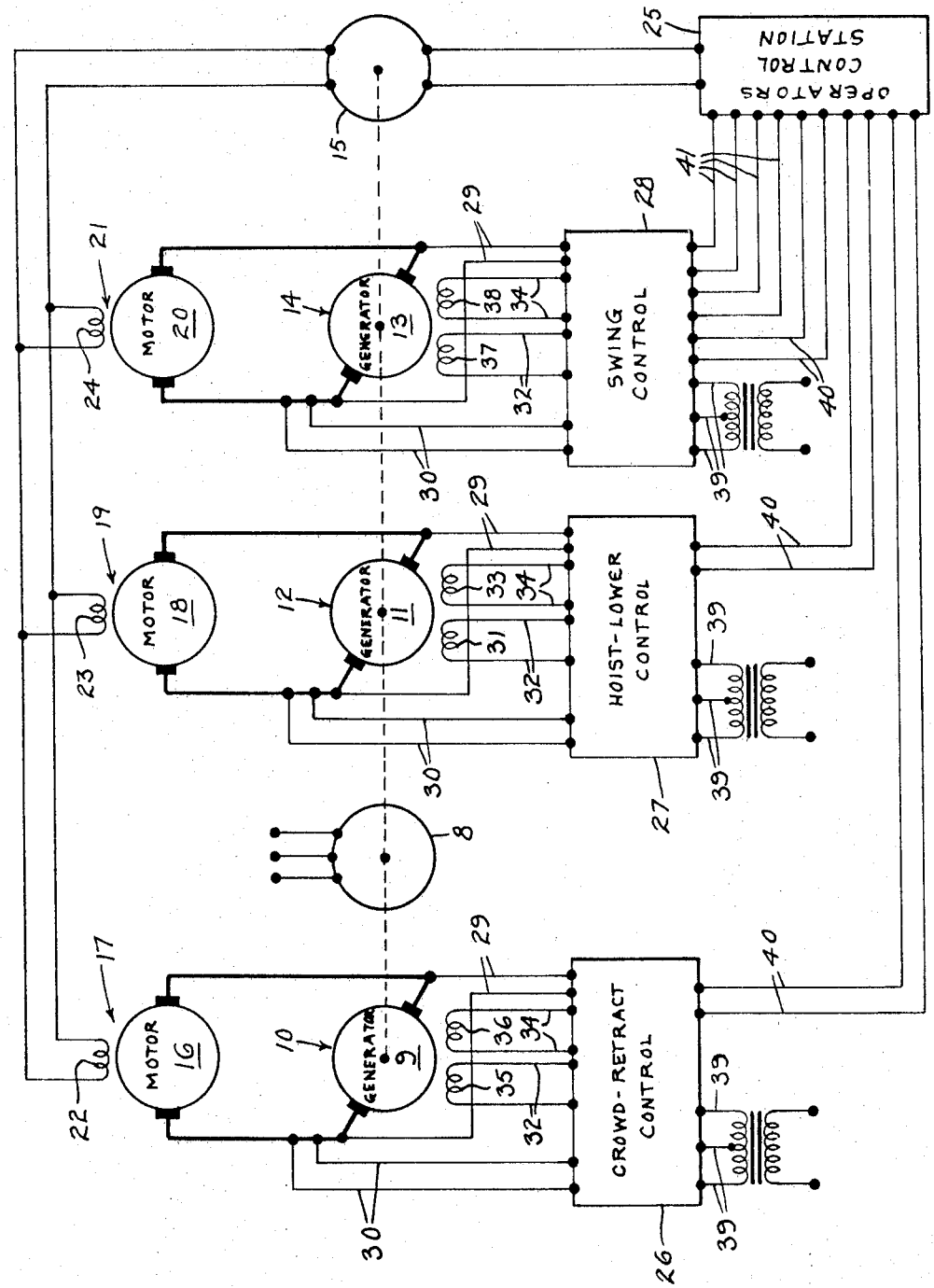

This invention relates to electrical controls for excavating machinery such as power shovels, draglines and the like.

In the instance of power shovels there are three principal movements that must be controlled. First, there is the hoist-lower movement of the dipper, in which the hoist, or digging stroke of the dipper is accomplished by drawing in a digging cable attached to the dipper. For the reverse motion of lowering the dipper the cable is payed out. Second, there is the crowd-retract movement in which the dipper stick and dipper are thrust, or crowded outward from the machine. This motion is also used in applying pressure against the bank for taking a bite of material being excavated, and the complementary motion is a retracting of the dipper. The third movement is the swinging of the cab either to the right or to the left. For each of the three movements it is common to employ a motor-generator set in which the generator feeds controlled amounts of power to the motor, and the motor performs the mechanical function of rotating a cable drum for hoisting or lowering the dipper, or of working the dipper stick to crowd and retract the dipper, or of turning the swing gears for left or right rotation of the cab. The generator output of each motor-generator set is controlled by varying the generator field excitation, and very complex electrical controls have heretofore been provided for this purpose.

The operator has at his disposal manual controls for developing electrical signals indicating the excavator movements desired, and the control circuits translate these signals for controlling the generator fields. Feedback signals from the motor-generator set are also fed to the control circuits for regulating purposes, and for excavators of any substantial size the control circuits are highly complex and require large amounts of space for housing the many circuit components involved.

One of the objects of this invention is to reduce the complexity of control circuits for the motor-generator sets, and this is accomplished with a dramatic reduction in the number and size of cabinets required for housing the controls. A reduction in the number of electrical components in the controls greatly improves the reliability of operation, and down time of the excavator for maintenance of electrical circuits is accordingly reduced, to thereby have improved operating efficiency which is important in modern quarrying and excavating operations.

In conjunction with the improving of maintenance, it is another object of this invention to provide control panels that each mount control circuit components that can be used either for the hoist-lower mower-generator set, the crowd-retract motor-generator set, or the swing motor-generator set of a power shovel. In the instance of a dragline excavator the control panels would be adapted for a drag-payout movement instead of a crowd-retract movement, and the invention is applicable to a variety of excavating apparatus. Thus, any control panel for an excavating machine can be used for any motor-generator set of the machine, and in the event of a fault, an entire control circuit on a single panel can be removed and another installed for immediate operation of the excavator, thereby minimizing down time and allowing the fault to be detected and corrected without interference with excavator operation. By providing a control circuit adaptable for use in controlling any of the excavator movements manufacture is simplified and handling of repair parts in the field is facilitated.

In order to achieve a control circuit that can be mounted on a single panel and which can be used for controlling any of the several motions of an excavator, it has been a further object to provide a control circuit that operates at higher power levels for its input signals than prior devices. A reduction in the number of components is thereby achieved, and also adjustment can be made for receiving any of the various input signals from the motor-generator load circuits of hoist, crowd and swing drives without substitution of components that receive the input signals. By operating at higher power levels in the control circuits, it is also possible to use more rugged components which withstand the abusive treatment to which excavators are normally subjected.

Another object of the invention is to reduce the number of controlled rectifiers required for admitting current to the generator field windings. In circuits of the invention one controlled rectifier for each generator field winding is sufficient, and as a result the magnetic amplifiers used to control the rectifiers need not be balanced with the extreme care necessarily exercised in prior circuits. When a generator is turned off, or when a switching from one field winding for one direction of motion to the other field winding for a reversal of direction of motion is undertaken the energy of the first excited generator winding is almost instantaneously dissipated through rectifiers, and very rapid switching from hoist to lower, or crowd to retract, or swing right to swing left may be made. Hence, efficient excavator operation is maintained, while obtaining a reduction in the number of controlled rectifiers and magnetic amplifiers required.

The efficiency of a digging cycle can be improved if high levels of speed for the dipper movements can be maintained. In some control systems the operator must sense a loss in speed before he can apply additional power to overcome digging resistance, or he must sense a reduction in crowding action before applying additional power to maintain optimum digging. Hence, a large proportion of the excavating cycle is well below excavator capacity, and it is a purpose of this invention to provide a control circuit that operates an excavator at selected speed without slow downs as described. The control circuits senses, through feedback of voltage and current signals, the resistance of a bank and nearly instantaneously automatically adjusts for maintaining selected speed. Hence, the invention strives for and provides both circuit simplification and optimum operating efficiencies.

The foregoing and other objects and advantages of this invention will appear from the description to follow. In the description reference is made to the accompanying drawings which form a part hereof and in which there is shown by way of illustration several specific embodiments of the invention. These embodiments will be described in sufficient detail to enable those skilled in the art to practice this invention. The invention may also reside in other embodiments and various modifications and rearrangements, as may occur to one practicing the art. Consequently, the following detailed description is not to be taken in a limiting sense; instead the scope of the invention is best defined by the claims at the end of this specification.

Figure 3:
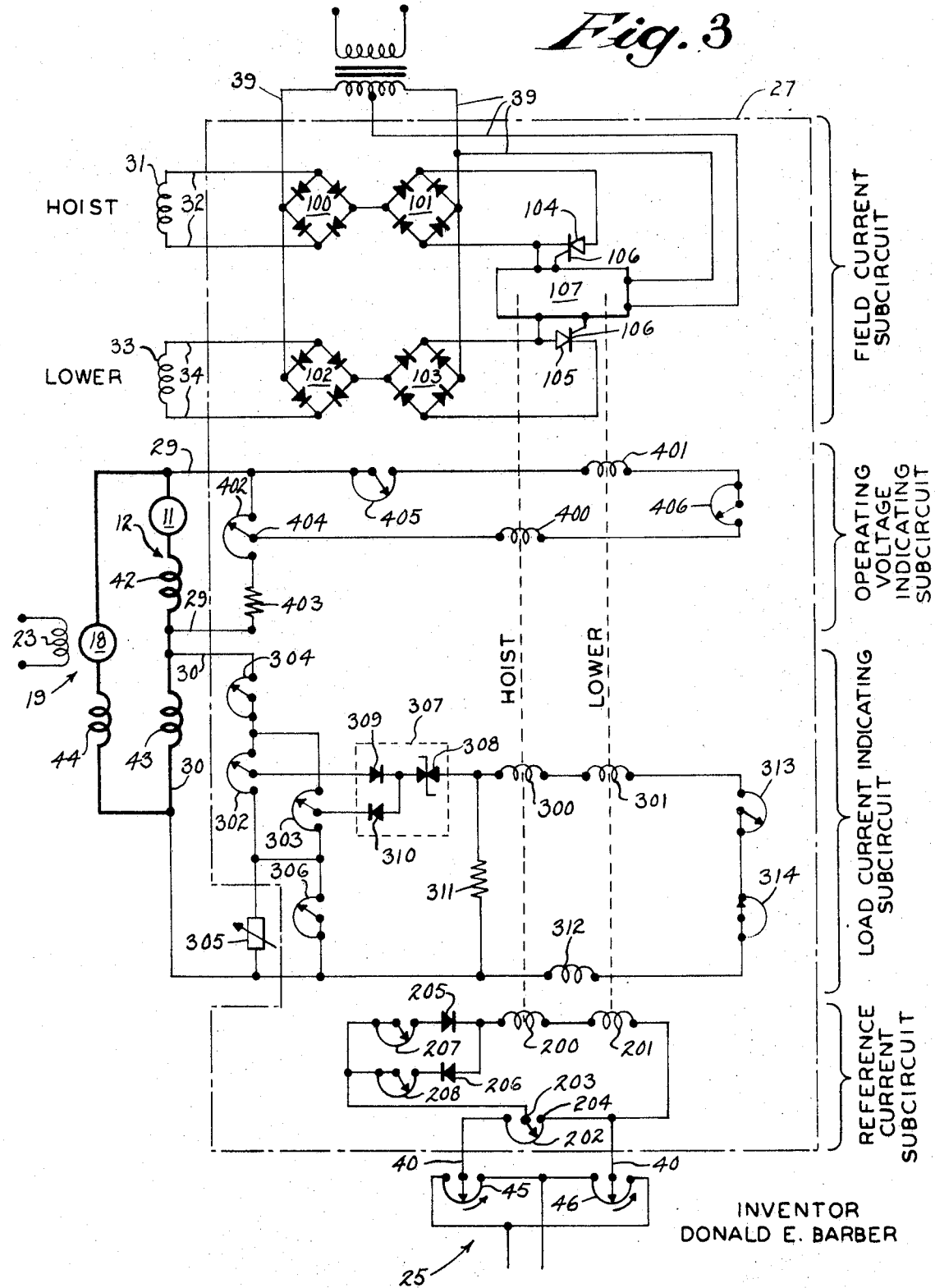
Figure 7:
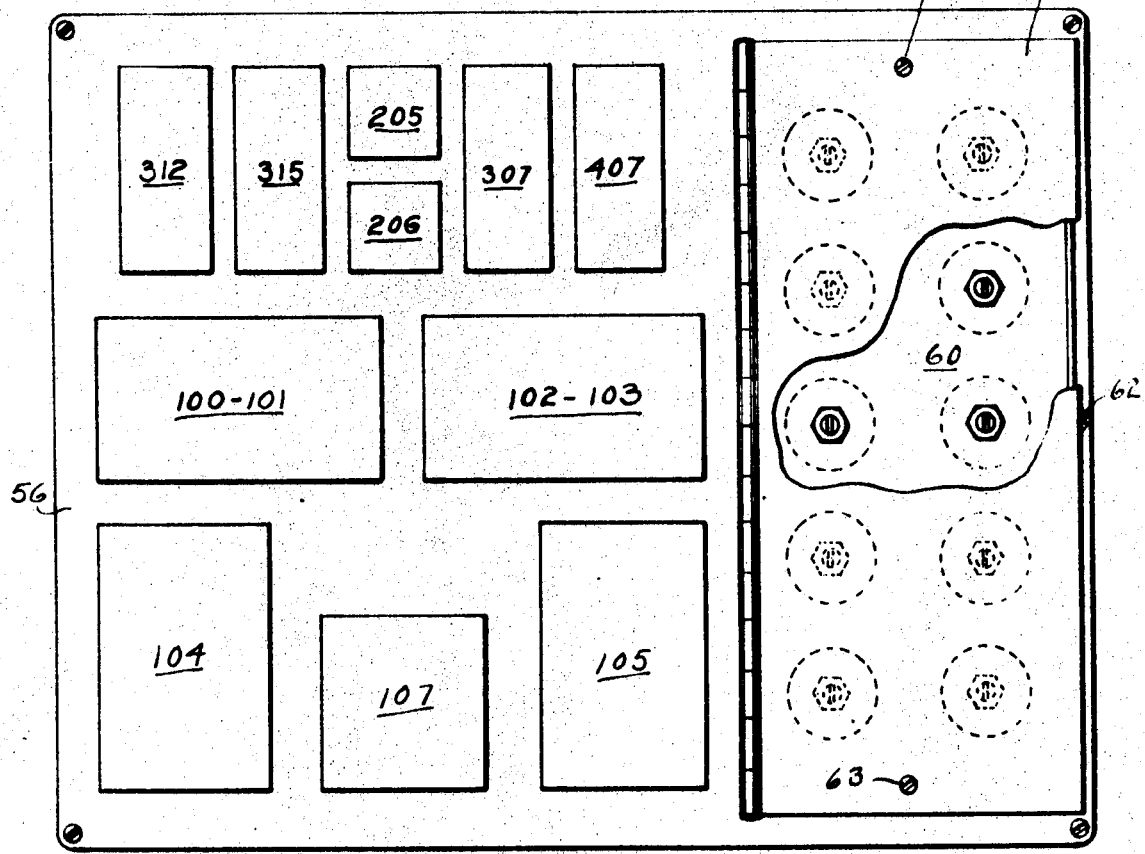
Figure 8:
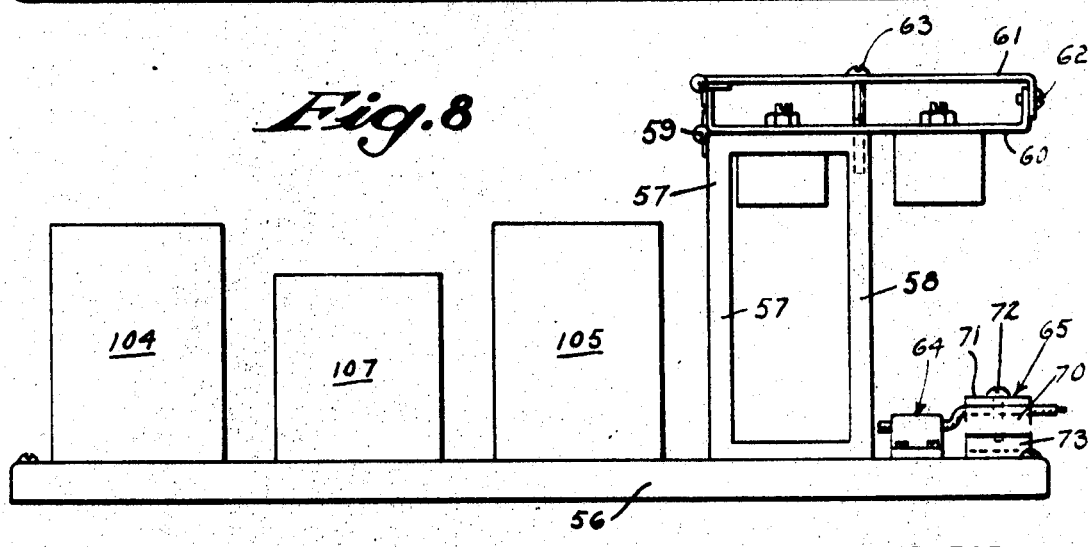
Figure 12:
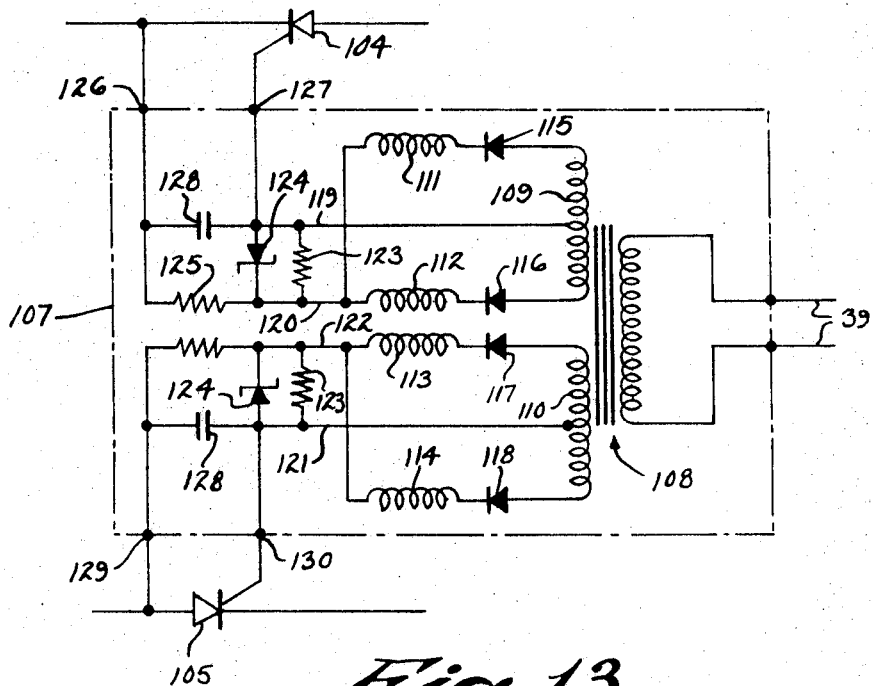
Figure 13:
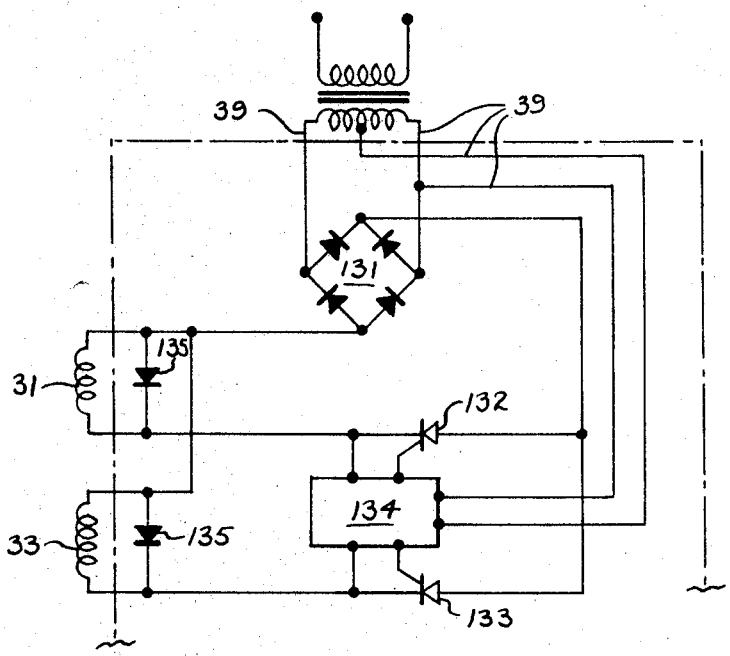
Figure 14:
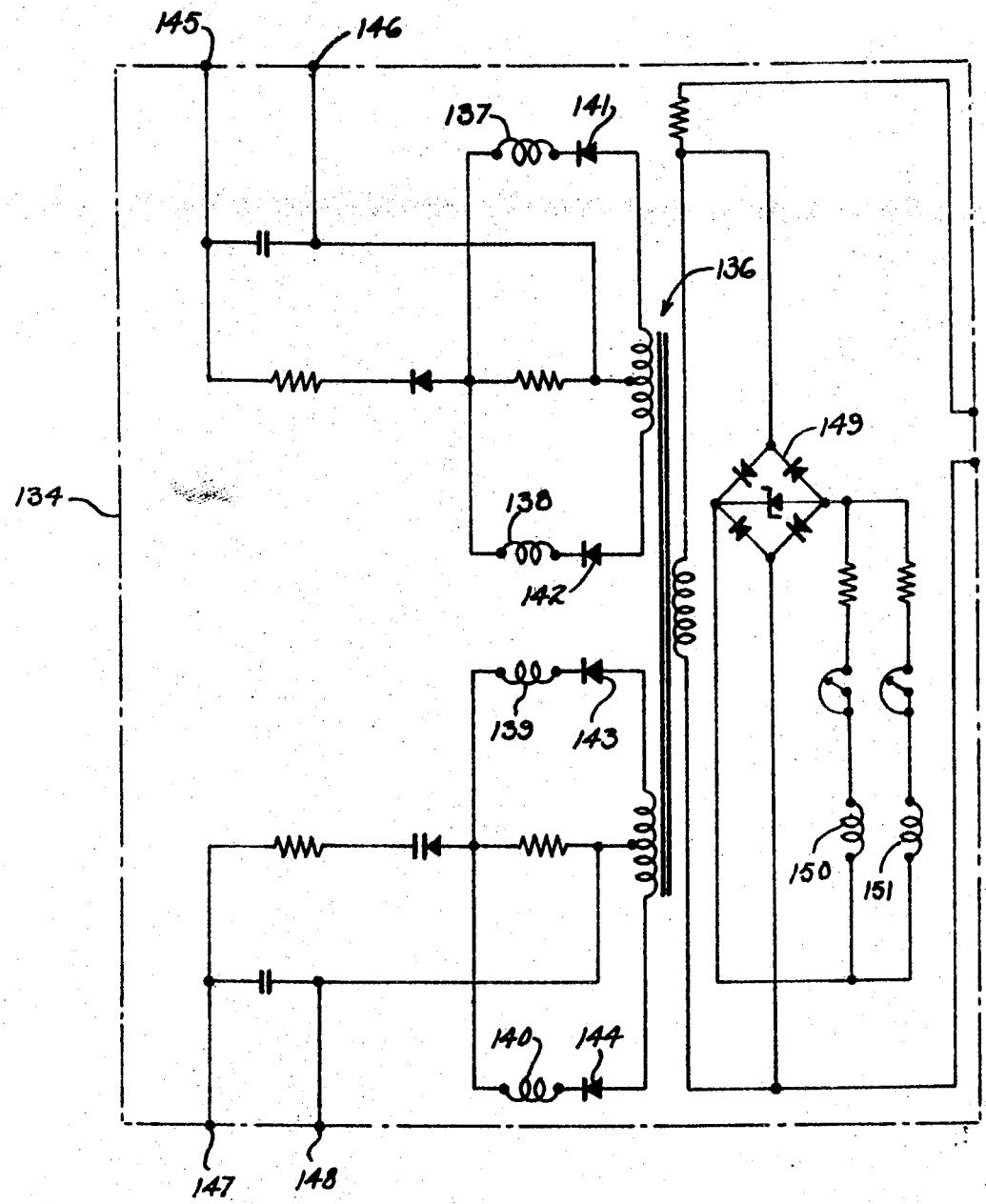
Figure 15:
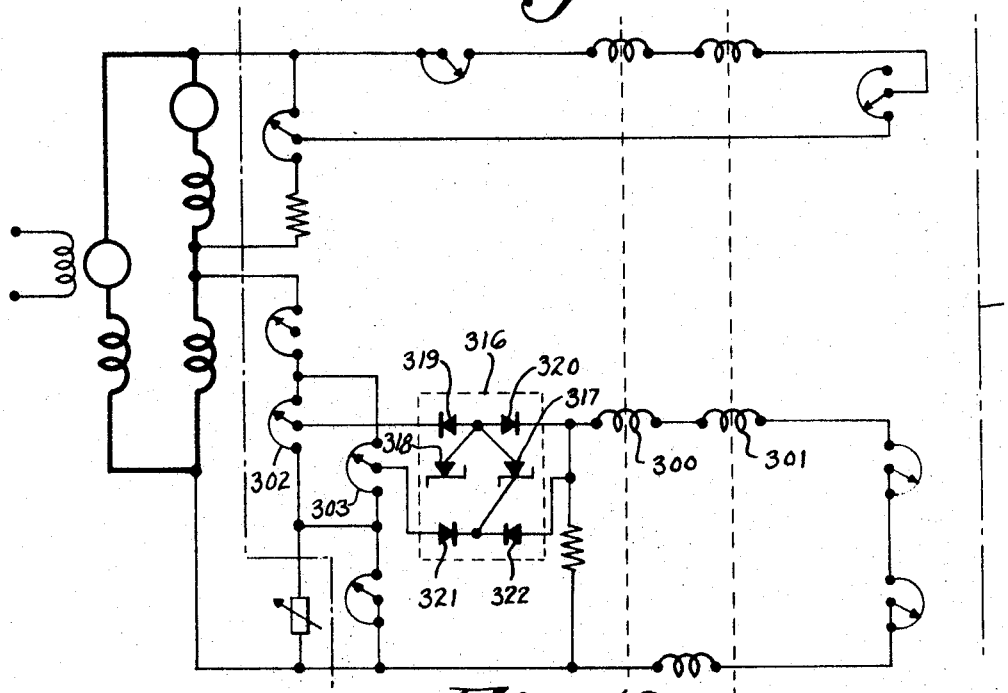
Figure 16:
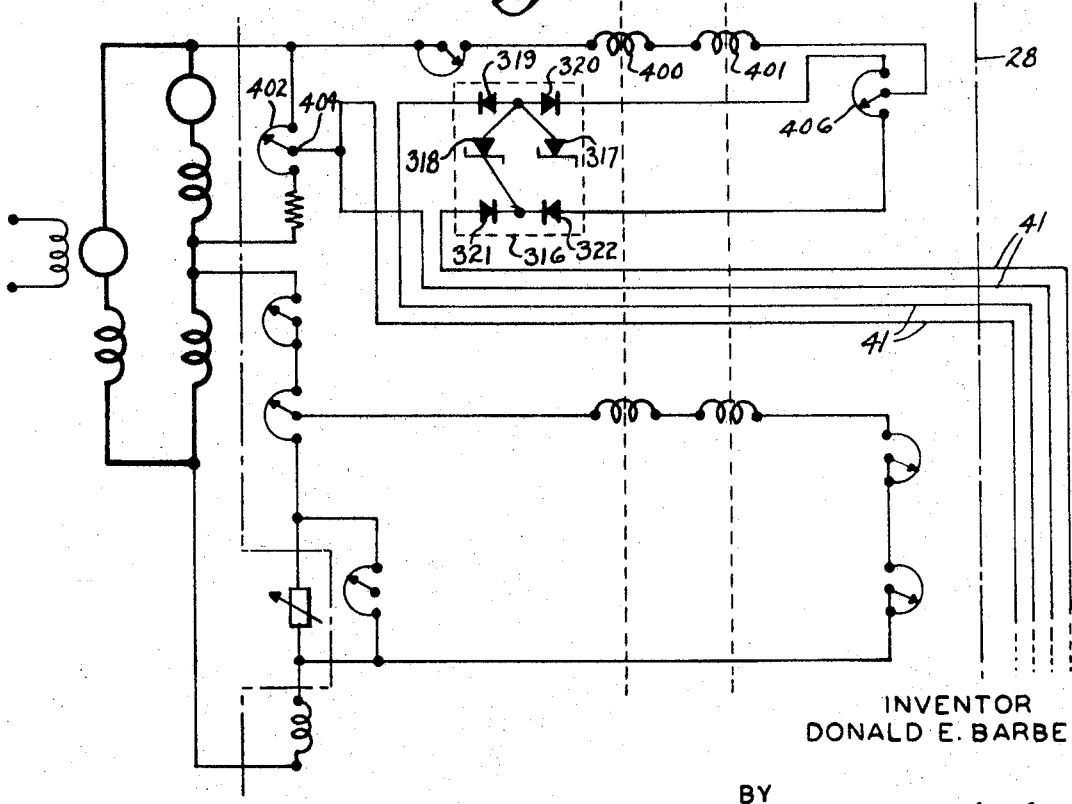

In the drawings:

FIG. 1 is a view of an excavating machine of a type that may be controlled through the use of the present invention, FIG. 2 is a schematic wiring diagram for the electrical equipment that controls an excavator as shown in FIG. 1, which electrical equipment embodies the present invention, FIG. 3 is a schematic wiring diagram for a hoist-lower control circuit, and also for a crowd-retract control circuit, for the electrical equipment shown in FIG. 2, FIG. 4 is a schematic wiring diagram for a swing control circuit for the electrical equipment of FIG. 2, FIG. 5 is a graph of operating characteristics for the swing movements of the excavator, FIG. 6 is a graph of operating characteristics for the hoist-lower movements of the excavator, FIG. 7 is a plane view of a panel mounting the circuit components of a control circuit embodying the invention, FIG. 8 is a side view in elevation of the panel of FIG. 7, FIG. 9 is a view in elevation of a cabinet mounting control circuits of the invention, FIG. 10 is a fragmentary view of a panel of the invention, FIG. 11 is a fragmentary view taken on the plane 11—11 shown in FIG. 10, FIG. 12 is a schematic wiring diagram for a magnetic amplifier type of wiring control device used in the circuits of FIGS. 3 and 4, FIG. 13 is a schematic wiring diagram for an alternative form of the sub-circuit for supplying generator field current that may be used in the invention, FIG. 14 is a schematic wiring diagram of an alternative form of magnetic amplifier firing control device that may be used in the circuit of FIG. 13, FIG. 15 is a schematic wiring diagram of an alternative form of voltage and current responsive sub-circuits of the invention which are connected for hoist-lower or crowd retract control, and FIG. 16 is a schematic wiring diagram of the alternative form of sub-circuits of FIG. 15 connected for swing control.

GENERAL CONSTRUCTION

Referring now to the drawings, there is shown in FIG. 1 an excavator having a crawler base 1, a rotatable cab 2 which houses the operating machinery for the excavator, a boom 3, a dipper stick 4 and a dipper 5. The dipper 5 is raised and lowered by a digging cable 6, and the dipper stick 4 is moved outward, in a crowding motion, and rearward, in a retract motion, by a set of cables 7. The excavator has three principal movements that must be controlled in its operation. The first movement is the hoisting of the dipper 5 by drawing in the cable 6 and the complementary lowering of the dipper 5 by paying out the cable 6. This is termed the hoist, or the hoist-lower movement, and for this movement the cable 6 is wound and unwound from an appropriate motor driven drum within the cab 2. The second movement of the excavator is the outward extension of the dipper stick 4 through manipulation of cables 7, and the complementary retraction of the dipper stick 4, also accompanied by manipulation of the cables 7. This second movement is commonly known as the crowd, or crowd-retract movement. The third movement is the swinging motion of the cab 2, either to the right or to the left, and this movement is termed the swing movement.

Each of the three movements is carried out through operation of a motor-generator set in which the output of the generator is fed directly to the motor, and the generator output is controlled to increase or decrease the driving power delivered by the motor. The motor output shaft, in turn, is connected in driving relation to the particular machinery for accomplishing the excavator movement. In FIG. 2 these motors are represented schematically together with the generators and circuits used to control them. Referring now to this figure, a three phase motor 8 functioning as a prime mover has its shaft connected to the armature 9 of the crowd-retract generator 10, the armature 11 of a hoist-lower generator 12, the armature 13 of a swing generator 14 and to a D.C. exciter 15. The output current of the crowd-retract generator armature 9 is fed to the armature 16 of crowd-retract motor 17, the output current of the hoist-lower generator armature 11 is fed to the armature 18 of a hoist-lower motor 19, and the output current of the swing generator armature 13 is fed to the armature 20 of a swing motor 21. The field windings 22, 23 and 24 of the three motors 17, 19, 21 are fed at constant excitation by the D.C. exciter 15. The output of the exciter 15 is also fed to an operator's control station 25 to provide a source of operating voltage therefor.

For each of the three principal movements there is provided a control circuit, shown in block form in FIG. 2. Thus, there is a crowd-retract control 26, a hoist-lower control 27 and a swing control 28. These three controls 26, 27, 28 have similar connections with the generators they control. For example, the hoist-lower control 27 receives a signal indicative of generator armature voltage through a pair of leads 29, it receives a signal indicative of motor-generator load current through a pair of leads 30, and it furnishes control amounts of field current to the generator hoist field winding 31 through a pair of leads 32 and to the generator lower field winding 33 through a pair of leads 34. Similarly, the crowd-retract control 26 is connected through like leads, which have been given the same reference numerals as for the hoist-lower control, to the crowd-retractor generator 10, which has a generator crowd field winding 35 and a generator retract field winding 36. The connections between swing control 28 and swing generator 14 are also the same, and like reference numerals have been applied to the leads forming these connections. The swing generator has a swing left field winding 37 and a swing right field winding 38.

Each of the controls 26, 27, 28 has a set of power input leads 39 and a pair of reference control voltage input leads 40 extending from the operator's control station 25, a reference voltage signal is fed through the leads 40 from manually operated potentiometers in the station 25, and the swing control 28 also has a set of four additional leads 41 extending to the operator's control station 25 for connection with manually operated switch contacts, as will be subsequently described herein.

HOIST-LOWER CONTROL

The controls 26, 27 and 28 are of like construction, and are interchangeable with one another, so that a common control can be utilized for any of the three movements of the excavator. Taking the hoist-lower control 27 as an example, the circuit forming such control is shown in FIG. 3, with the parts located within the phantom line designated by the numeral 27 constituting the control. Such parts are preferably mounted on a single panel to facilitate the universal character of the control, whereby all controls 26, 27, 28 may be constructed in identical fashion. Then, in the event of an electrical failure within a control circuit during excavating in the field an entire control panel can be immediately substituted for remedy of the fault.

In FIG. 3 the armature circuit of the hoist-lower generator 12 is shown in greater detail than in FIG. 2, in that the generator includes a series field winding 42 and a commutating field winding 43, and the hoist-lower motor 19 includes a commutating field winding 44.

Field current sub-circuit

At the top of FIG. 3 there is shown a sub-circuit for supplying generator field current, and the power input leads 39 for the control 27 are connected to this sub-circuit. The leads 39 feed power to a first pair of full wave rectifiers 100 and 101 and to a second pair of full wave rectifiers 102 and 103. The first pair of rectifiers 100, 101 are connected to the generator hoist field winding 31 through the leads 32 to supply a direct current excitation thereto, and the rectifiers 100, 101 are also connected to a current gating control rectifier 104, which governs the amount of direct current fed through the rectifiers 100, 101 to the generator field winding 31. Similar connections are provided for the second pair of rectifiers 102, 103 which have their output connected through the leads 34 to the generator lower field winding 33, and which have their output current controlled by a second current gating control rectifier 105. The control rectifiers 104, 105 are preferably of the silicon control rectifier type, but other forms of current gates such as thyratron tubes may be utilized. Each control rectifier 104, 105 includes a control element 106 connected to a firing control device 107, which may be in the form of a magnetic amplifier circuit of which various designs are well known, and which serves the purpose of governing the time in each half cycle in which the associated control rectifiers 104, 105 will fire to admit current to the associated generator field winding 31 or 32. Thus, if a hoisting operation is taking place, in which the excavator dipper 5 is being brought up through a bank in a digging motion, the hoist generator field winding 31 is excited to develop requisite power, and the field winding current will pass in the half cycle when the right hand lead 39 is positive from such lead 39 through the upper right leg of the rectifier 101, the control rectifier 104, the lower left leg of the rectifier 101, the lower right leg of the rectifier 100, the hoist field winding 31, the upper left leg of the rectifier 100 and out the left hand lead 39. In the subsequent half cycle current will enter the lower left leg of the rectifier 100 from the left hand lead 39, pass through the winding 31, then the rectifiers 100 and 101, then the controlled rectifier 104 and the lower right leg of the rectifier 101 to the right hand lead 39.

The excitation of the hoist generator field winding 31 governs the output, or load current of the generator armature 11 which is fed to the hoist-lower motor armature 18. The motor turns to drive the drum for drawing in the the hoist cable 6. The motor field winding 23 is under constant excitation from the D.C. exciter 15, and the power output of the apparatus in a hoisting motion is seen to be dependent upon the control signals of the firing control device 107 fed to the control element 106 of the rectifier 104. For a lowering motion of the dipper 5, the generator field winding 33 is energized by the firing control device 107 operating the control element 106 of the control rectifier 105. The rectifiers 102, 103 then function similarly as the rectifiers 100, 101 did for a hoist motion.

In FIG. 12 there is illustrated a circuit for the firing control device 107. It is a magnetic amplifier circuit in which there is provided an input transformer 108 having two sets of output windings 109 and 110 that feed the power windings 111–114 of a pair of magnetic amplifiers. These power windings 111–114 are fed through rectifying diodes 115–118, as is the common practice in magnetic amplifier design, and various control windings to be described are inductively coupled to the windings 111–114, as in usual amplifier design. The output of the windings 111, 112 of one amplifier appears across a pair of leads 119 and 120, while the output of the windings 113, 114 of the other amplifier appears across a pair of leads 121 and 122. A bleeder resistor 123 is connected across the leads 119 and 120 and a voltage limiting Zener diode 124 is in parallel with the resistor 123. A current limiting resistor 125 is connected between one end of the diode 124 and an output terminal 126. The other end of the diode 124 is connected directly to a second output terminal 127 and a filter capacitor 128 is connected across the output terminals 126, 127. As is shown, connections are made from the terminals 126 and 127 to the control rectifier 104. Similar circuit elements are connected between the leads 121 and 122 as between the leads 119 and 120 and like reference numerals are applied thereto. These elements connect to a second set of output terminals 129 and 130, and as shown the terminals 129, 130 are in turn connected to the control rectifier 105.

There are provided three pairs of control windings for the magnetic amplifiers of the firing control device 107. One winding of each pair is for hoisting, and the other is for lowering. The three pairs are shown in FIG. 3, and comprise reference current windings 200, 201 which conduct a current signal controlled by the operator of the excavator, load current indicating windings 300, 301 which conduct a current signal indicative of the load current in the generator armature-motor armature circuit, and operating voltage indicating windings 400, 401 which carry a current signal indicative of the armature voltage of the generator 12. The three separate sub-circuits for the three pairs of amplifier windings will now be discussed separately.

Reference current sub-circuit

For the reference current sub-circuit, at the bottom of FIG. 3, the leads 40 extending from the operator's control 25 provide a voltage signal which is derived from a pair of manually operated potentiometers 45, 46 forming a part of the operator's control 25. The potentiometers 45, 46 are connected in parallel across a direct current source and they are ganged to move in unison. When they are in their center positions, as shown in FIG. 3, the voltage differential between the taps of the two potentiometers 45, 46 is zero, and consequently no signal is fed to the reference current windings 200, 201. This is the condition in which neither hoisting or lowering of the dipper 5 will take place. As the taps of the potentiometers 45, 46 are shifted to the right an increasing potential appears across the leads 40, and as the taps of the potentiometers 45, 46 are shifted to the left of their center positions an increasing potential of opposite polarity appears across the leads 40. One polarity is for signalling a hoist of the dipper 5 and the other polarity is for signalling a lowering of the dipper 5. The magnitude of the potentials indicates the speed of dipper movement desired by the operator.

An input potentiometer 202 in the control 27 is connected across the leads 40, and the potentiometer tap 203, and the right end 204 of the potentiometer 202 are connected to the reference current windings 200, 201. This connection is through a pair of diodes 205, 206, or other suitable unidirectional devices, and a pair of variable adjustment resistors 207 and 208. The diode 205 and the variable resistor 207 are in series with one another, and the other diode 206 and the other variable resistor 208 are similarly in series with one another. Each diode 205, 206 and its associated resistor 207 or 208 is in parallel with the other diode and resistor, so that one diode and variable resistor provide a current adjustment for the reference current windings 200, 201 for one direction of control current, and the other diode and variable resistor provide a current adjustment for a reverse flow of control current. These adjustments are provided in order to have a latitude of control over the firing time of the firing control device 107 in response to the manual signalling of the operator. The input potentiometer 202 provides a wide range of adjustment in order to select various current ranges for the windings 200, 201 or to match these windings to a range of input signal values. A relatively low resistance of large wire size can be utilized for this potentiometer 202, so that substantial control currents may be conducted to the reference voltage windings 200, 201. The use of the input potentiometer 202 also eliminates ballast resistors, which would usually be necessary if a series connection were to be had between the reference current windings 200, 201 and the signal voltage from the leads 40. Also, through the use of the input potentiometer 202 the identical circuit for the windings 200, 201 may be used in both the swing generator control 28 and the crowd-retract generator control 26, as well as the hoist-lower generator control 27.

As will be understood, when the ganged potentiometers 45, 46 are shifted in one direction a corresponding direction of current flow is established in the reference current windings 200, 201. For example, a direction of signal current flow for a hoisting motion of the dipper 5 will cause the current in the winding 200 to indicate to the firing control device 107 the timing for firing the hoist control rectifier 104, and the signal current in the winding 201 will cause the firing control device 107 to retain the lowering control rectifier 105 in off condition. In this manner, a current in one direction through the reference current windings 200, 201 will cause one control rectifier 104 or 105 to admit current to the associated generator field winding, and a reverse current in the windings 200, 201 will cause controlled admission of current to the other generator field winding. Either a hoisting or lowering operation is thereby signaled by the operator by a shifting of his control of the potentiometers 45, 46 either to the right or to the left.

Load current indicating sub-circuit

A load current indicating sub-circuit is shown immediately above the reference current sub-circuit in FIG. 3. In this sub-circuit the load current indicating windings 300, 301 conduct signal currents opposing those of the windings 200, 201, and these signal currents are proportional to the load current flowing in the circuit of the generator armature 11 and motor armature 18. To provide the signal current for the windings 300, 301 a pair of control potentiometers 302 and 303 are connected in parallel, and they in turn are connected in series with a variable resistor 304 and a thermistor 305 across the generator commutating field winding 43. The commutating winding 43 presents a voltage drop substantially proportional to load current, and if desired the potentiometers 302, 303, the variable resistor 304 and the thermistor 305 may be connected across any other suitable element in the load current circuit of the armatures 11, 18 which provides a voltage drop indicative of load current. The purpose of the thermistor 305 is to provide a compensation for changes in resistance value of the commutating field winding 43 that occur with temperature change. Hence, the thermistor 305 is mounted beside the winding 43, and to have an adjustment for the thermistor 305 there is provided a variable resistor 306 connected in parallel therewith.

A discontinuous current gate 307, comprising a Zener diode 308 and a pair of unidirectional current elements in the form of diodes 309 and 310, is inserted between the taps of the control potentiometers 302, 303 and the load current indicating windings 300, 301, which are joined in series with one another. The Zener diode 308 functions to admit or spill current through the gate 307 only upon a predetermined voltage being applied to the device. Thus, the gate 307 is non-linear in nature, with a sharp discontinuity in its operation, so that the term discontinuous is used herein to connote its characteristic. The discontinuous gate 307 may be conveniently potted as a small unitary assembly, and current will flow in one direction through the windings 300, 301 from the tap of the potentiometer 302, one diode 309 and the Zener diode 308. Current will flow in the opposite direction through the Zener diode 308, the diode 310 and the tap of the potentiometer 303. As a result, when the load current circulating between generator and motor armatures 11, 18 is in one direction the signal current in the windings 300, 301 will be in a correlated direction, and when the armature load current is in the opposite direction the signal current in the windings 300, 301 will likewise flow in the opposite direction. For signal current flow in one direction the potentiometer 302 and diode 309 are active, and for signal current flow in the opposite direction the potentiometer 303 and the diode 310 are active. Thus, the potentiometers 302, 303 provide independent adjustment for applying a voltage across the Zener diode 308 for each direction of armature load current. The potentiometer 302 may be selected for the excavator hoist motion and the potentiometer 303 for the lowering motion. As will be discussed hereinafter, the settings of the potentiometers 303, 302 are critical in the determination of the point of operation of the apparatus at which the load current indicating windings 300, 301 commence to dominate the regulation of the circuit.

A spill current resistor 311 is connected across the Zener diode 308, so that when the Zener diode 308 conducts, or spills current, a substantial current will be drawn through the Zener diode 308 to obtain a sharp demarcation between the states of non-conduction and conduction of the Zener. A choke 312 is in series with the windings 300, 301 to suppress induced harmonics, and a pair of adjustment resistors 313 and 314 are also placed in series with the load current indicating windings 300, 301. The purpose of the resistors 313 and 314 will be described hereinafter.

Operating voltage indicating sub-circuit

In FIG. 3 the sub-circuit for the operating voltage indicating windings 400, 401 is between the field current sub-circuit and the load current indicating sub-circuit. In this sub-circuit there is provided a control potentiometer 402 and a voltage absorbing resistor 403 that are connected across the generator armature 11 and the series field winding 42. The tap 404 and one side of the control potentiometer 402 are connected to the operating voltage indicating windings 400, 401, which are in series with one another and an adjustment resistor 405. A potentiometer 406 is also inserted in the series circuit of the windings 400, 401, but it is dormant as an adjustment for the particular connections shown in FIG. 3.

The variation in voltage that appears across the generator armature 11 is quite substantial, and the resistor 403 is provided to absorb a large proportion of this voltage. The control potentiometer 402 may be adjusted to pick off a proportion of the current that flows through the resistor 403. The resistances of the components 405, 406 reduce harmonics, and their principal purposes will hereinafter be described in connection with the swing generator control 28. The direction of signal current that flows in the operating voltage indicating windings 400, 401 depends upon the polarity of the generator armature 11, and the connections are such that the appropriate winding 400 or 401 provides a signal in opposition to that of the active reference current winding 200 or 201. Thus, as the voltage across the generator armature 11 increases the degree of saturation of the magnetic amplifier forming a part of the firing control device 107 is decreased, to retard the firing time of the control rectifier 104 or 105 and reduce the generator field current. Thus, the variation in voltage across the generator armature 11 is sensed by the operating voltage indicating windings 400, 401, and they function to regulate the generator output to maintain the setting manually selected by the operator.

The graph of FIG. 6 shows a family of operating curves that are attained for the hoisting, or digging motion of the dipper 5 through use of the control circuit of FIG. 3. The ordinate of this graph represents the hoisting speed of the dipper 5, which is directly related to motor armature speed, and hence armature voltage. The abscissa of the graph represents the digging force applied through the pull of the cable 6, which is proportional to armature load current. It is seen that for each of the curves, such as the 100% speed curve 47, that for a setting by the operator of his manual control the speed will remain substantially constant until a digging force approximately 60% of maximum force is reached, which point is indicated by the knee 48 on the curve 47. Thus, an operator can operate the equipment at a desired speed and as resistance to the digging action of the dipper increases additional force will be applied nearly instantaneously without loss of speed. As 60% of the maximum digging force is reached the speed will decrease, which indicates to an operator that the limits of the excavator power capacity are being approached. The position of the knee 48 on the curve 47 is regulated by adjustment of the control potentiometer 302 (this being the active potentiometer for hoisting), so that the knee may be extended to the right, or shifted to the left as desired. By adjustment of the potentiometer 302 the load current value is established at which the Zener diode 308, and hence the discontinuous current gate 307, will break down and admit, or spill, current into the windings 300, 301. It is at this point, where the Zener diode 308 begins to conduct, that the windings 300, 301 become active in the control of the current admitted to the generator field winding 31. The development of signal current in the windings 300, 301 has a limiting effect upon the firing control device 107, as evidenced by the knees in the characteristic curves of FIG. 5. As further increases in armature load current are detected the signal current in the load current indicating windings 300, 301 also increases to further curtail the duration of firing of the silicon control rectifier 104. In this fashion the generator field current is reduced, and the curve 47 of FIG. 5 slopes downwardly as further loading is imposed upon the system. The downward slope of the curve 47 is determined principally by adjustment of the variable resistor 313. The variable resistor 313 is of relatively large resistance, as compared to the variable resistor 314, and it is used for the adjustment when the non-linear current gate 307 is in the circuit. The foregoing description for the circuit of FIG. 3 has covered the operation of a hoist, or digging motion of the dipper 5, and when the dipper 5 is lowered a similar operation is obtained, but in this instance the potentiometer 303 and diode 310 control the load current value at which the Zener diode 308 spills current to the windings 300, 301.

CROWD-RETRACT CONTROL

The description and operation of the circuit of FIG. 3 is also applicable to the crowd-retract control 26. The control 26 has the same construction as the control 27, and the components of the control 26 are likewise mounted on a single panel. Thus, an identical circuit with identical components is utilized to control the crowding and retracting of the dipper 5, whereby operating curves like those of FIG. 5 are also obtained for the crowd-retract movement of the excavator. The load current indicating windings function to limit the crowding force applied, and the operating voltage indicating windings function as a feedback which regulate the speed of movement of the dipper stick 4 to maintain the manual selection of the operator.

SWING CONTROL

The swing control 28 for the swing generator 14 is shown in FIG. 4. The components for this control circuit are also mounted on a single panel, and the mounted components are the same as for the panel of controls 26 and 27. The connections for the swing control circuit vary, however, from that shown in FIG. 3, so as to switch some of the mounted components out of the active circuit and to switch in other components. But since the identical control panel is utilized for the circuit of FIG. 4 a universally applicable panel is used for all excavator movements. The wiring connections are altered principally to achieve the insertion of a discontinuous current gate into the sub-circuit for the operating voltage indicating windings, whereby this sub-circuit now becomes a load current limiting type of circuit, and to remove the discontinuous current gate 307 from the load current indicating winding sub-circuit, so that sub-circuit now functions principally as a regulating feedback circuit.

In FIG. 4, the generator 14 has a series field winding 49 and a commutating field winding 50 in addition to the two controlled field windings constituting the swing left field winding 37 and the swing right field winding 38. The swing motor 21 has a commutating field winding 51 and the separately excited field 24, that is also shown in FIG. 2. The generator field current sub-circuit of the swing control 28, which supplies controlled amounts of current to the generator field windings 37 and 38, is the same as that shown in the upper portion of FIG. 3. Hence, the same reference numerals have been applied in FIG. 4 as in FIG. 3 for this part of the control, and the nature of the operation of this part of the control is the same as that hereinbefore stated for the hoist-lower circuit of FIG. 3. For the firing control device 107 of FIG. 4 the three sets of magnetic amplifier control windings comprising reference current windings 200, 201, load current indicating windings 300, 301 and operating voltage indicating windings 400, 401 are all the same as those shown in FIG. 3, so that like designating reference numerals, the same as in FIG. 3, are applied.

Referring now to the reference current sub-circuit at the bottom of FIG. 4, the manually operated ganged potentiometers 45, 46 are the same as in FIG. 3, so that the same designating reference numerals are applied in FIG. 4, and in addition this part of the operator's control station 25 includes a pair of switches 52, 53 that are closed whenever the potentiometers 45, 46 are moved from their central position. For the reference current windings 200, 201 the sub-circuit is also the same as that in FIG. 3 and accordingly like numerals have again been applied. Thus, to establish a swinging motion, either to the right or to the left, the operator will manipulate his ganged potentiometers 45, 46 and feed a corresponding signal to the potentiometer 202, which in turn delivers a portion of the current to the windings 200, 201 to signal the firing control device 107 to energize the appropriate generator field windings 37 or 38.

For the sub-circuit of the load current indicating windings 300, 301 only certain circuit elements shown in FIG. 3 are utilized in FIG. 4. The potentiometer 303, the discontinuous current gate 307 and the resistor 311 are removed from the circuit, also, a harmonic suppressing choke 315 of different value is substituted for the choke 312 and is placed in a slightly different location. Otherwise, this sub-circuit remains the same as that shown in FIG. 3, so that no further circuit components are required. In FIG. 4 the components not used in the swing control 28 are shown in dotted lines to illustrate the distinction between the connections of the swing control 28 and the hoist-lower and crowd-retract controls 26, 27. In constructing the controls suitable terminals are provided for making the necessary changes in connections between the two controls, whereby any control is interchangeable for swing, hoist-lower and crowd-retract movements.

The sub-circuit of FIG. 4 for the operating voltage indicating windings 400, 401 is similar to that in FIG. 3, with the exception that a discontinuous current gate 407 is inserted and connection is made with the leads 41 that extend to the pair of manual switches 52 and 53 ganged with the potentiometers 45 and 46 in the operator's control station 25. The discontinuous current gate 407 includes a Zener diode 408 and a pair of unidirectional current elements in the form of diodes 409 and 410. One side of the Zener diode 408 is connected to the variable resistor 405, and the opposite side is connected to the tap 411 of the potentiometer 406. One diode 409 is connected between operating voltage indicating winding 401 and the tap 404 of the potentiometer 402, and the other diode 410 is connected between the other winding 400 and the tap 404 of the potentiometer 402. The opposite sides of the windings 400, 401 are connected to opposite sides of the potentiometer 406 through the leads 41 and the switches 52 and 53.

In the operation of the circuit of the swing control 28, when the operator throws his control lever, to produce a signal across the leads 40 and to close the switches 52, 53, the signal delivered to the reference current windings 200, 201 will initiate a swing to the right or left, depending upon the direction indicated by the signal output of the potentiometers 45, 46. As load current is established in the circuit of the generator and motor armatures 13, 20 an appropriate signal will be fed to the load current indicating windings 300, 301. This signal in the windings 300, 301 opposes that in the reference current windings 200, 201, and if armature load current increases the windings 300, 301 function to signal the firing control device 107 for a reduction of current admitted to the generator field winding 31 or 33. A decrease in armature load current will work an opposite effect, and, hence, the load current indicating windings 300, 301 now function to regulate the armature current to maintain a selected value rather than to sharply limit the load current after reaching a certain value, as in the control of FIG. 3. Consequently, the turning torque delivered to the swing gears is maintained substantially at the operator's setting. For purposes of adjustment of the load current indicating sub-circuit of FIG. 4 the variable resistor 314 is used in place of resistor 313. It has a lower resistance than resistor 313, so that it matches the higher current levels which are employed when the sub-circuit regulates, as distinguished from limiting load current as in the circuit of FIG. 3.

When the generator armature voltage rises to a predetermined relatively large value, as set by adjustment of the control potentiometer 402, the Zener diode 408 of the discontinuous current gate 407 will break down and spill current through the appropriate windings 400 or 401. This sudden flow of current in the windings 400 or 401 has an opposing effect upon the signal of the reference current windings 200, 201 which causes a sharp limitation upon output to the generator windings 37 or 38. The form of characteristic operating curve developed through the use of the discontinuous current gate 407 in the operating voltage winding circuit is shown in FIG. 5. In FIG. 5 the swing speed is represented by the ordinate and the abscissa represents the swing load, and there is a family of curves for different adjustments of the potentiometers 45, 46. The maximum swing load curve 54 has a straight, vertical characteristic with a knee 55 from which the curve slopes upwardly and to the left.

The height of the knee 55 is governed by the setting of the potentiometer 402, and the slope upward from the knee 55 is governed by the setting of the potentiometer 406. The curves show that the operator may set his control for a given load, i.e. exerting a selected turning torque, and that when speed increases to the knee of the curve the power output of the swing control is limited by reason of the conduction of the Zener diode 408.

When the operator has commenced a swinging motion, and then brings his control handle back to a neutral position the switch contacts 52, 53 are opened. This opens the operating voltage indicating sub-circuit across the generator armature 13, so that there will be no regenerative braking which would otherwise occur if a completed circuit were allowed to be maintained across the armature 13. This precludes a sudden halt in the swinging motion, which would be characteristic of a regenerative braking. A moderate deceleration is important for handling a high inertia load composed by a loaded dipper at the end of an extended dipper stick. The necessity of properly handling such high inertia loads at extended distances from the center of the excavator is a prime consideration in providing the form of operating curves shown in FIG. 5. The operator can apply a selected output load, and the apparatus will be regulated to maintain this output load until the swing speed increases to near the capacity of the excavator. Load output then drops off, and the excavator will operate within the limits set by the operator, and, hence, a desirable control over high inertia swinging loads is provided.

THE PHYSICAL PANEL

A form of panel that may be employed in mounting the circuit components of any of the controls 26, 27 or 28 is illustrated in FIGS. 7 and 8. A flat metal base 56 with turned edges and which is suitable for mounting in a cabinet has the various components shown in FIGS. 3 and 4 mounted thereon. The current gating control rectifiers 104 and 105 together with the firing control device 107 are mounted in a row along the bottom of the base 56. These and other components are shown schematically in block form. Above the components 104, 105 and 107 are the full wave rectifiers 100–103 which supply current to the generator field windings through the control rectifiers 104, 105. Smaller components are mounted upon the base 56 above the full wave rectifiers and they comprise: the diodes 205 and 206 in the sub-circuit of the reference current windings 200, 201; the discontinuous current gates 307 and 407 which comprise potted assemblies embedding the Zener diodes and diodes comprising such current gates; and the harmonic suppressing chokes 312 and 315.

Along the right hand side of the base 56, as viewed in FIGS. 7 and 8, there is an upwardly rising partition wall 57 and a pair of mounting posts 58. The wall 57 has a hinge 59 along its upper edge which mounts a panel board 60 upon which the several potentiometers and variable resistors in the control circuit are mounted. A cover 61 is hinged to the board 60 and it overlies the adjustment screws of the potentiometers and variable resistors. The cover 61 may be locked or latched in closed position by means of a screw 62, so that upon adjustment of the variable resistances they can be closed off from tampering. To retain the combination of panel 60 and cover 61 in place a pair of bolts 63 are inserted through these members 60, 61 into the posts 58.

Beneath the panel board 60 the wall 57 defines an area in which the fixed resistors (not shown) of the control circuit may be mounted. Also, a terminal strip 64 and a lead wire fanning block 65 are mounted on the base 56 under the panel board 60, as shown in FIG. 8. The intrapanel wiring for the panel is not shown in FIGS. 7 and 8, but the manner of wiring the three panels of an excavating machine into the electrical circuits for the machine is illustrated in FIGS. 9, 10 and 11.

In FIG. 9 the three panels, "crowd," "swing" and "hoist" for an excavating machine are shown in a cabinet 66. This cabinet 66 also houses other electrical components for the machine, which are not a part of the invention, and alongside the three panels is a wiring trough 67. This trough 67 houses the conductors leading into and out of the three panels, and the manner of connection is illustrated in the fragmentary views of FIGS. 10 and 11. In FIGS. 10 and 11 a portion of a terminal strip 64 and a lead wire fanning block 65 are shown adjacent to the trough 67 and the numerous conductors 68 in the trough. Conductors are led through appropriate openings 69 in the trough 67 and through the fanning block 65 to the terminal strip 64, at which point electrical connection is made between the panel and external circuit components.

The fanning block 65 is comprised of a slotted base 70 and a flat cover 71. In initial assembly, at the factory, the various conductors are laid in the slotted base 70, and then the cover 71 is permanently attached to the base 70, so that the conductors are held in spaced, or fanned position. As a result, if it is desired to remove a control panel in the field the conductors are disconnected from the terminal strip 64 and the block 65 is removed from the panel by removal of the mounting screws 72 which engage mounting brackets 73. By folding back the block 65 the panel is removed and another is substituted. The block 65 is then secured on the substitute panel, and the block correctly positions the conductors for ready attachment to the new terminal strip 64. Thus, the new panel is correctly wired for "crowd," "swing" or "hoist" control.

A particular feature of the terminal strip 64 and fanning block 65 is that conductors making internal connections in the panel are mounted in the block 65. For example, in FIG. 10 there is shown a conductor 74 that connects at both of its ends 75 and 76 with the terminal strip 64. This conductor 74 makes an internal connection in the panel, such as for example joining the discontinuous current gate 307 of FIG. 3 into the active circuit if the panel is to be used for hoist-lower control, or for omitting the current gate 307 if the panel is for the swing control of FIG. 4. Thus, any panel substituted into the apparatus will be correctly wired for its particular duty.

CIRCUIT VARIATIONS

Variations within the skill of the art can be made in the various sub-circuits comprising a control 26, 27 or 28 without departing from the invention. An example of a variation of the field current sub-circuit supplying the generator field windings is shown in FIGS. 13 and 14. Referring first to FIG. 13, hoist-lower generator field windings 31 and 33 together with input leads 39 are shown similarly as in FIG. 3. In place of the four full wave rectifiers 100–103 there is substituted a single full wave rectifier 131 that feeds both field windings 31 and 33. A current gating controlled rectifier 132 is provided for the field winding 31, and a second current gating control rectifier 133 is provided for the field winding 33. A firing control device 134 is provided for governing the flow of current through the rectifiers 132, 133, and to complete the circuit a unidirectional current device in the form of a discharge diode 135 is connected across each of the windings 31 and 33. In the operation of the sub-circuit of FIG. 13 the output of the full wave rectifier 131 is fed either through the control rectifier 132 to the winding 31 or through the control rectifier 133 to the field winding 33, the selection of course being accomplished through the firing control device 134 and the associated control windings 200, 201, 300, 301, 400, 401 (which are not shown in FIG. 13). The function of the discharge diodes 135 is to provide a low resistance discharge path for dissipating the energy of the magnetic field associated with either the windings 31 or 33 when the current to such windings is cut-off. By having these discharge diodes across the windings 31, 33 a very rapid dissipation of stored magnetic energy is accomplished to allow the control rectifiers 132, 133 to retain control of the circuit, and also to obtain quick switching from hoist to lower, or alternatively from lower to hoist. The same function of quickly dissipating the energy of the windings 31, 33 is also accomplished in FIG. 3 by the full wave rectifiers 100 and 102.

A circuit for the firing control device 134 is shown in FIG. 14, which constitutes a variation from the circuit of FIG. 12. An input transformer 136 is provided which feeds magnetic amplifier power windings 137–140 through rectifiers 141–144. The output is fed through the terminals 145 and 146 for controlling the current gating rectifier 132, and through the terminals 147 and 148 for governing the other control rectifier 133. In the circuit of FIG. 14 there is also provided a full wave rectifier 149 which feeds magnetic amplifier bias windings 150 and 151 through suitable adjustment potentiometers 152 and 153. The windings 150 and 151 are an additional set of control windings supplementing windings 200, 201, 300, 301, 400 and 401 and are for the purpose of minimizing hunting of the magnetic amplifier control circuit. Such antihunt windings 150 and 151 are incorporated in magnetic amplifiers of substantial gain, and their purpose in the circuit of FIG. 14 follows this usual practice in the art. Thus, the magnetic amplifier firing control device 134 shown in FIG. 14 illustrates a higher gain magnetic amplifier which may be employed in the circuitry of the invention.

Referring now to FIGS. 15 and 16, there is shown therein an alternative form of the sub-circuits for the load current indicating windings 300, 301 and the operating voltage indicating windings 400, 401. The principal variation of FIGS. 15 and 16 from FIGS. 3 and 4 is the use of a modified form of discontinuous current gate 316 which is employed in either the load current indicating winding sub-circuit, when such sub-circuit functions as a load current limiting circuit in the hoist-lower or crowdretract controls 26 and 27, or which can be employed in the operating voltage indicating windings sub-circuit when such sub-circuit is a load current limiting circuit in the swing control 28.

Referring first to FIG. 15, in which the discontinuous current gate 316 is connected with the load current indicating windings 300 and 301, it is seen that the gate 316 comprises two Zener diodes 317 and 318 together with a set of four unidirectional current devices in the form of diodes 319–322. The diode 319 is connected to the center of potentiometer 302 and the diode 320 is connected to the load current indicating windings 300. The diode 321 is connected to the center of potentiometer 303 and the remaining diode 322 is also connected to the load current indicating windings 300, 301. The Zener diodes 317 and 318 are connectable between the first set of diodes 319, 320 and the second set of diodes 321, 322. When the discontinuous current gate 316 is used in conjunction with the windings 300 and 301 one of the Zener diodes 317 is actively connected into this circuit, and when the discontinuous current gate 316 is used in conjunction with the windings 400, 401, as shown in FIG. 16, the other Zener diode 318 is actively connected into the circuit. The function of the discontinuous current gate 316 when connected in the circuit of FIG. 15 is the same as for the discontinuous current gate 307 of FIG. 3. Thus, the Zener diode 317 spills over at a predetermined load current level to cause the windings 300, 301 to limit further load current increases.

Turning now to FIG. 16, the current gate 316 is shown with the diodes 319 and 321 connected to the center 404 of the potentiometer 402 through the leads 41 and the manually operated switches 52 and 53 (not shown in FIG. 13). The other diodes 320 and 322 are connected across the potentiometer 406, and through such potentiometer 406 to the windings 401 and 400. As mentioned above, the Zener diode 318 is now actively connected in the circuit, and the discontinuous current gate 316 functions in FIG. 13 similarly as the current gate 407 in FIG. 4. An advantage of the current gate 316 is that a single potted component may be employed for both the swing control 28 and one of the other controls 26, 27. The particular Zener diode is selected which handles the particular current and voltage values of the sub-circuit in which it is used.

CIRCUIT VALUES

In the construction of the panels rugged components and potted components can be employed throughout to provide protection from vibration and environment. This is accomplished in part by using reasonably high power levels for the sub-circuits. For example, the reference current windings 200, 201 can be designed for operation at current values of fifty to eighty milliamperes, the load current indicating windings 300, 301 can be operated at current values in the range of 20 to 40 milliamperes when operated through a discontinuous current gate, to have a limiting type of control, and at current values ranging from fifty to eighty milliamperes when operated as regulating windings without the discontinuous current gate. Like current ranges may be employed for the operating voltage indicating windings 400 and 401. The ranges of twenty to forty milliamperes and fifty to eighty milliamperes is a substantially higher power level than heretofore used, and the use of reasonably high power levels accomplishes both the use of heavy duty components suitable for excavator service, and the elimination of resistive components otherwise necessary to reduce power levels to that previously employed.

The high power levels attainable in the circuits also contribute to very rapid responses to control signal currents, and this in turn enhances excavator control. The greater reference current ampere-turns that are utilized enable the magnetic amplifier control to be driven into a greater degree of saturation by the reference current windings 200, 201, and this gives a greater amount of forcing which results in a fast response both in transient conditions and in regulation. By use of higher power levels in the windings 200, 201 and the feedback sub-circuits of the windings 300, 301 and 400, 401 the gain of the magnetic amplifier may be a lower value. This enables the use of bias windings in the magnetic amplifier, and the stability of the circuit is enhanced. The gain of the amplifier can be less than 300 volts per ampere turn and this parameter taken with the current levels stated above gives an indication of the circuit attainable in the use of the invention.

The control circuits of the invention not only provide desirable operating characteristics, as described in connection with FIGS. 5 and 6, and a significant reduction in circuit components that facilitates maintenance and interchangeability of panels, but also a control circuit of given components is usable with a wide range of excavating apparatus. For example, one size of panel will operate all motions of power shovels from four through fifteen cubic yard capacities, and since the same panel is used for all three excavator movements the stocking of a single spare panel gives complete parts protection for a fleet of excavators of various sizes. Also, the control is usable for draglines and other equipment as well as power shovels.

The feature of interchangeable panels utilizes, in the embodiments shown, a mounting cabinet in which conductors are brought up to the panel positions, and by making connections to the panels, as dictated by the preselected assembly of the conductors, each panel will be connected both internally and externally to function for control of hoist, swing, crowd or drag movements as required. Each mounting space in the cabinet is for a particular excavator movement, and the conductors that lead up to the panels are held in fixed array to not only facilitate quick connection, but to properly connect the discontinuous current gates, chokes and the like in circuits which distinguish control of hoist from swing or other movement. The manner of properly connecting the components within the circuit of a panel could also be accomplished by a switch, or similar device, on the panel. The panels remain interchangeable and thus facilitate repair in the field and make for more efficient use of the excavator being controlled.

I claim:

1. In a control system for governing one of the motor generator sets of an excavator the combination of:
   a mounting panel;
   a field current sub-circuit having a direct current source for connection to generator windings, a current gate for the direct current source, and a control for the current gate all mounted upon said panel;
   a reference current sub-circuit having reference current windings for said control and a variable resistance for adjusting current to the windings all mounted upon said panel;
   a load current indicating sub-circuit having first feedback windings for said control and a variable resistance means for adjusting current to the feedback windings mounted upon said panel;
   a voltage indicating sub-circuit having second feedback windings for said control and second variable resistance means for adjusting current to the second feedback windings mounted upon said panel;
   discontinuous current gate means mounted upon said panel;
   circuit connections for joining said discontinuous current gate means alternatively with either said first or second feedback windings; and
   circuit means for selectively joining said circuit connections to have said discontinuous current gate means connect with the desired feedback windings for matching with the motor generator set to be governed.

2. In a control circuit for governing movements of excavating machinery having rectifying means for supplying controlled amounts of current to a generator field; a controllable current gate joined with said rectifying means which has a control element for controlling the amount of current admitted to said generator field; a firing control for said current gate connected to the control element of said current gate; a reference current winding associated with said firing control; a load current indicating winding associated with said firing control; and an operating voltage indicating winding associated with said firing control; the combination therewith of:
   a reference current sub-circuit having input leads to receive a control voltage, and a potentiometer across said input leads with the tap of the potentiometer joined with said reference current winding;
   a load current indicating sub-circuit having a pair of control potentiometers in parallel with one another, connections for joining the control potentiometers across an element of a motor-generator load current circuit, and a discontinuous current gate connectable between said pair of control potentiometers and said load current indicating winding; and
   an operating voltage indicating sub-circuit having a control potentiometer for connection to a motor-generator load circuit, a discontinuous control gate, and connections for joining the discontinuous current gate with said operating voltage indicating winding across said control potentiometer, and said connections providing for the removal of said discontinuous current gate from the active circuit.

3. A control circuit as in claim 2 wherein the current levels of the sub-circuits are at least 40 ma.

4. A control circuit as in claim 2 wherein said firing control is a magnetic amplifier, said windings are parts thereof, the gain of the amplifier is less than 300 volts per ampere turn and the current levels of the sub-circuits are at least 40 ma.

5. In a control circuit for governing movements of excavating machinery having means for supplying current to generator field windings; controllable current gate means joined with said current supplying means for controlling the amount of current admitted to said generator field windings; a firing control for said current gate means; a reference current-sub-circuit associated with said firing control adapted to receive a signal from an operator's control and translate the same to the firing control; and a load current indicating element associated with said firing control, the combination therewith of:
   a load current indicating sub-circuit having a pair of control potentiometers each adapted to be joined with an element in a motor-generator load current circuit to have a voltage applied thereto that is indicative of load current, a discontinuous current gate insertable between said control potentiometers and said load current indicating element whereby the value of load current for admission of signal current to said element is controlled by said control potentiometers, a variable resistance connected with said load current indicating element for adjusting the amount of current flowing in said load current indicating upon conduction of said discontinuous current gate, there further being circuit connections to remove said discontinuous current gate from active relationship with said load current indicating element.

6. In a control circuit for governing movements of excavating machinery having means for supplying controlled amounts of current to a pair of generator field windings; a pair of controllable current gates joined with said current supplying means, each current gate having a control element for controlling the amount of current admitted to a generator field winding, whereby one current gate controls current for one direction of an excavating machine movement and the other current gate controls current for a reverse direction of such movement, a firing control connected to the control elements of said current gates; a reference current sub-circuit associated with said firing control adapted to receive a signal from an operator's control and translate the same to said firing control; and a pair of operating voltage indicating elements associated with said firing control; the combination therewith of:

an operating voltage indicating sub-circuit having a voltage absorbing resistor, a control potentiometer in series with said resistor for connection to a motor-generator load circuit to have a voltage applied thereto, a discontinuous current gate insertable between said control potentiometer and said operating voltage indicating elements whereby the value of a voltage for the load current sub-circuit is controlled by adjustment of said control potentiometer, a variable adjustment resistance in circuit with said operating voltage indicating elements for adjusting the amount of current flowing in said elements upon conduction of said discontinuous current gate, and circuit connections providing for the removal of said discontinuous current gate from the active circuit.

7. In a control for an excavating machine having a generator and motor for each of the three machine movements, crowd-retract, hoist-lower, and swing, the combination comprising; a set of three interchangeable control circuits, one for each generator, with each control circuit having:

a source of direct current for supplying generator field windings; a controlled current gate associated with the direct current source; a firing control for the controlled current gate;

reference current windings for said firing control, an input potentiometer feeding the reference current windings;

load current indicating windings for said firing control, a discontinuous current gate connectable to said load current indicating windings for admitting current to the windings upon a voltage applied thereto reaching a predetermined value, a control potentiometer for applying voltage to the discontinuous current gate and which is adapted to receive a voltage from a motor-generator circuit;

operating voltage indicating windings for said firing control, a second discontinuous current gate connectable to said voltage indicating windings for admitting current to the windings upon a voltage applied thereto reaching a predetermined value, a second control potentiometer for applying voltage to said second discontinuous courrent gate and which is adapted to receive a voltage from a motor-generator circuit;

and there being connections for removing said discontinuous current gate associated with said load current indicating windings from the active control circuit for the swing generator, and said discontinuous current gates associated with the operating voltage indicating windings from the active control circuits for the hoist-lower and crowd-retract generators.

8. A control as in claim 7 wherein the current levels for the reference current windings extends to 50 to 80 ma., and for the operating voltage indicating windings, and load current indicating windings to at least 50 to 80 ma. when used for regulation and at least 20 to 40 ma. when operated through a discontinuous current gate.

9. A control as in claim 8 wherein the gain of said firing control is less than 300 volts per ampere turn.

10. A control as in claim 7 wherein each of said three control circuits has all the components thereof mounted on a single panel and the panels are interchangeable.

11. A control as in claim 7 wherein said discontinuous current gates comprise a single assembly that may be connected with either the load current indicating windings or operating voltage indicating windings.

12. A control as in claim 11 wherein the current levels for the operating voltage indicating windings and the load current indicating windings extends to 50 to 80 ma.

13. A control as in claim 11 wherein each of said three control circuits has all the components thereof mounted on a single panel and the panels are interchangeable.

14. In a control circuit for governing movements of excavating machinery having rectifying means for supplying current to generator field windings; a pair of controllable current gates joined with said rectifying means, each current gate having a control element for controlling the amount of current admitted to said generator field windings, whereby one current gate controls current for one direction of an excavating machine movement and the other current gate controls current for a reverse direction of such movement; a firing control for said current gates connected to the control elements of said current gates; a pair of reference current windings associated with said firing control; a pair of load current indicating windings associated with said firing control; and a pair of operating voltage indicating windings associated with said firing control; the combination therewith of:

a reference current sub-circuit having input leads to receive a control voltage, an input potentiometer across said input leads with the tap of the potentiometer joined with said reference current windings; a first unidirectional current element and adjustment resistance between said input potentiometer and said reference current windings, and a second unidirectional current element and adjustment resistance between said input potentiometer and said reference current windings;

a load current indicating sub-circuit having a variable limiting resistor, a thermistor with an adjustment resistance, a pair of control potentiometers in parallel with one another, connections for joining the variable limiting resistor, thermistor and paralleled control potentiometers in series with one another and across an element of a motor-generator load current circuit, a first unidirectional current element connectable with one of said control potentiometers to permit current flow through the potentiometer in one direction only, a second uni-directional current element connectable with the other of said control potentiometers to permit current flow through the potentiometer in only one direction, a Zener diode joined to said control potentiometers, connections for joining said Zener to said load current indicating windings, a spill current resistor across said Zener, a harmonic limiting element connected with said load current indicating windings, and low and high variable resistances connected with said reference current indicating windings, there further being circuit connections to remove said Zener from active relationship with said load current indicating windings; and an operating voltage indicating sub-circuit having a voltage absorbing resistor, a control potentiometer in series with said resistor for connection to a motor-generator load circuit, a Zener diode, a pair of unidirectional current elements, a variable adjustment resistance, connections for joining the variable adjustment resistance and Zener and unidirectional elements to said operating voltage indicating windings and across said control potentiometer whereby said unidirectional elements admit current flow in preselected directions to said operating voltage indicating windings, and said connections providing for the removal of said Zener from the active circuit.

15. In a control for an excavating machine having a generator and motor for each of three machine movements, the combination comprising:

a set of three control circuits, one for each generator, with each control circuit having;

a source of direct current for supplying generator field windings; a controlled rectifier; a firing control for the controlled rectifier;

reference current windings for said firing control; an input potentiometer feeding the reference current windings;

load current indicating windings for said firing control; a control potentiometer for supplying voltage to the load current indicating windings which is adapted to receive a voltage from a motor-generator circuit;

operating voltage indicating windings for said firing control, a second control potentiometer for supplying voltage to said operating voltage indicating windings which is adapted to receive a voltage from a motor-generator circuit;

a discontinuous current gate for two of the control circuits that is connected between the load current indicating windings and control potentiometer to admit current to the windings upon a voltage applied thereto reaching a particular value; and there being another discontinuous current gate for the other control circuit which is connected between the operating voltage indicating windings and second control potentiometer to admit current to the windings upon a voltage applied thereto reaching a particular value.

16. In a control for an excavating machine having a generator feeding a motor to execute a machine movement the combination comprising: a control circuit for the generator having a source of direct current for supplying the generator field windings, a controlled rectifier, a firing control for the controlled rectifier, reference current windings for said firing control, an input potentiometer feeding the reference current windings, load current indicating windings for said firing control, a discontinuous current gate connectable to said load current indicating windings for admitting current to the windings upon a voltage applied thereto reaching a considerable value, a control potentiometer for applying voltage to the discontinuous current gate and which is adapted to receive a voltage from the motor-generator circuit, operating voltage indicating windings for said firing control, and a second control potentiometer for supplying voltage to said operating voltage indicating windings which is adapted to receive a voltage from the motor-generator circuit.

17. A control as in claim 16 wherein current levels for the load current indicating windings exceed 20 ma. and current levels for the operating voltage levels exceed 50 ma.

18. A control as in claim 17 wherein the gain of the firing control is less than 300 volts per ampere turn.

19. In a control for an excavating machine having a generator feeding a motor to execute a machine movement, the combination comprising:

a control circuit for the generator having a source of direct current for supplying the generator field windings, a controlled rectifier, a firing control for the controlled rectifier, reference current windings for said firing control, an input potentiometer feeding the reference current windings, load current indicating windings for said firing control, a control potentiometer for supplying voltage to said current indicating windings which is adapted to receive a voltage from the motor-generator circuit, operating voltage indicating windings for said firing control, a discontinuous current gate connectable to said voltage indicating windings for admitting current to the windings upon a voltage applied thereto reaching a considerable value, and a second control potentiometer for applying voltage to said discontinuous current gate and which is adapted to receive a voltage from the motor generator circuit.

20. A control as in claim 19 wherein current levels for the load current indicating windings exceed 50 ma, and current levels for the operating voltage levels exceed 20 ma.

21. A control as in claim 20 wherein the gain of the firing control is less than 300 volts per ampere-turn.

22. In a sub-circuit for detecting a load current in the governing of a motion of an excavating machine, the combination comprising:

load current indicating windings for a firing control;

a discontinuous current gate in series relation with said windings;

a pair of uni-directional current elements each joined to the discontinuous current gate in opposite directions of current flow;

a pair of control potentiometer means adapted to be connected to a motor-generator load circuit to receive a signal voltage indicative of load current with each being connected to one of said uni-directional current elements;

a harmonic suppressing element connected in series with said reference current indicating windings;

low and high variable resistances connected with said reference current indicating windings;

and said harmonic suppressing element and variable resistances being connected with said windings to receive a signal current through the discontinuous current gate and its associated uni-directional elements and control potentiometer means.

23. In a sub-circuit for detecting an operating voltage in the governing of a motion of an excavating machine, the combination comprising:

operating voltage indicating windings for a firing control;

a voltage absorbing resistor;

a control potentiometer in series with said resistor for connection to a motor-generator load circuit;

a variable adjustment resistance;

connections joining the variable adjustment resistance with said operating voltage indicating windings across said control potentiometer;

a discontinuous current gate having a Zener diode and a pair of uni-directional current devices;

switch contacts; and connections joining said Zener diode through one diode and said switch contacts between said control potentiometer and said windings, and also connecting said Zener diode through said other device and switch contacts between said windings and said control potentiometer.

24. In a control for an excavating machine having a hoist-lower motor generator set, a crowd-retract motor generator set, and a swing motor generator set, the combination comprising:

a control circuit for the hoist-lower motor-generator set having:

a field current sub-circuit with saturable reactance means for controlling the current output thereof;

a reference current sub-circuit with a manually operable control resistance and reference windings for said saturable reactance means that draw control current in response to setting of the control resistance;

a load current indicating sub-circuit having a set of control windings for said saturable reactance means, a pair of unidirectional current valves, a discontinuous current member, variable resistance means, and connections joining the discontinuous current member with said unidirectional current valves, said resistance means and said control windings to admit current to the windings after application of a threshold voltage to the discontinuous current member, with the current flow being alternatively through one or the other of said unidirectional current valves and the variable resistance means controlling the amount of flow;

a voltage indicating sub-circuit having resistance means and second control windings for said saturable reactance means to receive current signals through said resistance means that is indicative of generator voltage;

such hoist-lower control circuit providing substantially uniform operating speed for each setting of said manually operable control resistance until said discontinuous current means commences to conduct;

a control circuit for the crowd-retractor motor generator set like that for said hoist-lower motor generator set; and a swing control circuit for the swing motor generator set having:

a field current sub-circuit with saturable reactance means for controlling the current output thereof;

a reference current sub-circuit with a manually operable control resistance and reference windings for said saturable reactance means that draw control current in response to setting of the control resistance;

a load current indicating sub-circuit having resistance means and control windings for said saturable reactance means which receive current signals through said resistance means that is indicative of generator current;

a voltage indicating sub-circuit having a second set of control windings for said saturable reactance means, a pair of unidirectional current valves, a discontinuous current member, variable resistance means, and connections joining the discontinuous current member with said unidirectional current valves, said variable resistance means and said second control windings to admit current to the windings after application of a threshold voltage to the discontinuous current member with the current flow being alternatively through one or the other of said unidirectional current valves and the variable resistance means controlling the amount of flow;

such swing control circuit providing substantially uniform swing torque for each setting of said manually operable control resistance until the discontinuous current means of the circuit commences to conduct.

25. A control as in claim 24 wherein the hoist-lower crowd-retract and swing control circuits are interchangeable and in which there are circuit connections for making the discontinuous current gates active or inactive in their respective control circuits.

26. In a control circuit for governing a motor-generator set the combination comprising:

a generator field current sub-circuit having a direct current source for connection to generator field windings to feed current to such windings in either of two directions of current flow and saturable reactance means joined to such source for controlling direct current flow;

a reference current sub-circuit with manually operable control means and a pair of reference windings for said saturable reactance means that draw control current in response to setting of said manually operable means, one winding being for one direction of generator field current and the other winding being for the opposite direction of generator field current;

a load current indicating sub-circuit having a pair of control windings for said saturable reactance means, one winding being for one direction of generator current and the other winding being for the opposite direction of generator current, a pair of unidirectional current valves, a discontinuous current member, and connections for joining the discontinuous current member, control windings and unidirectional current means across a portion of the motor-generator set with the unidirectional current means in parallel relation with one another for conducting current to the control windings in opposite directions of flow; and a voltage indicating sub-circuit having a pair of additional control windings for said saturable reactance means, one winding being for one polarity of generator voltage and the other winding being for the opposite polarity of generator voltage, a second pair of unidirectional current valves, a second discontinuous current member, and additional connections for joining the second discontinuous current member, additional control windings and second unidirectional current means across a portion of the motor-generator set with the second unidirectional current means in parallel relation with one another for conducting current to the additional control windings in opposite directions of flow;

said connections of the load current indicating sub-circuit and said additional connections of the voltage indicating sub-circuit being adapted to alternatively place one discontinuous current member in active circuit relation with saturable reactance control windings and removing the other discontinuous current member from an active circuit relation.

27. In a control circuit for governing a motor-generator set the combination comprising:

a generator field current sub-circuit having a direct current source for connection to generator field windings to feed current to such windings in either of two directions of current flow, and saturable reactance means joined to such source for controlling direct current flow;

a reference current sub-circuit with manually operable control means and a pair of reference windings for said saturable reactance means that draw control current in response to setting of said manually operable means, one winding being for one direction of generator field current and the other winding being for the opposite direction of generator field current;

a load current indicating sub-circuit having a pair of control windings for said saturable reactance means, one winding being for one direction of generator current and the other winding being for the opposite direction of generator current, a pair of unidirectional current valves, a discontinuous current member, and connections joining the discontinuous current member, control windings and unidirectional current means across a portion of the motor-generator set, the unidirectional current means being in parallel relation with one another for conducting current to the control windings in opposite directions of flow; and a voltage indicating sub-circuit having a pair of additional control windings for said saturable reactance means, one winding being for one polarity of generator voltage and the other winding being for the opposite polarity of generator voltage, and additional connections for joining the additional control windings across a portion of the motor-generator set that indicates generator voltage.

28. In a control circuit for governing a motor-generator set the combination comprising:
a generator field current sub-circuit having a direct current source for connection to generator windings to feed current to such windings in either of two directions of current flow, and saturable reactance means joined to such source for controlling direct current flow;
a reference current sub-circuit with manually operable control means and a pair of reference windings for said saturable reactance means that draw control current in response to setting of said manually operable means, one winding being for one direction of generator field current and the other winding being for the opposite direction of generator field current;
a load current indicating sub-circuit having a pair of control windings for said saturable reactance means, one winding being for one direction of generator current and the other winding being for the opposite direction of generator current, and connections for joining the control windings across a portion of the motor-generator set that indicates generator current;
a voltage indicating sub-circuit having a pair of additional control windings for said saturable reactance means, one winding being for one polarity of generator voltage and the other winding being for the opposite polarity of generator voltage, a pair of unidirectional current valves, a discontinuous current member, and additional connections for joining the discontinuous current member, additional control windings and unidirectional current means across a portion of the motor-generator set, the unidirectional current means being in parallel relation with one another for conducting current to the additional control windings in opposite directions of flow.

References Cited

UNITED STATES PATENTS 2,722,653 11/1955 Fischer et al. _____ 322—25
2,929,983 3/1960 Abell _____ 322—36

BENJAMIN DOBECK, Primary Examiner

W. E. DUNCANSON, JR., Assistant Examiner

U.S. Cl. X.R.

318—143